E. L. ASCHENBACH.
GAUGE.
APPLICATION FILED MAR. 5, 1920.
1,414,165.
Patented Apr. 25, 1922.
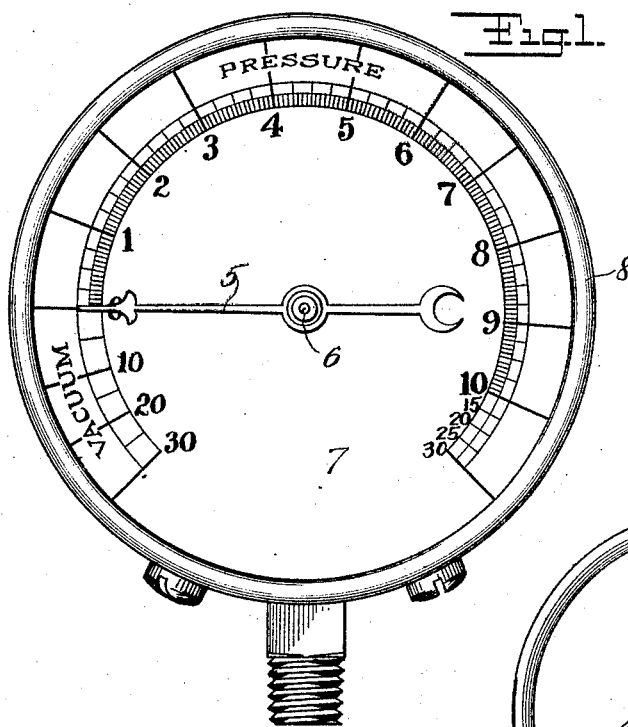
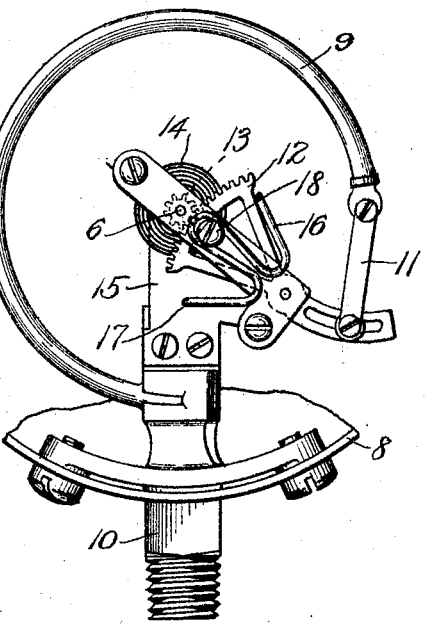
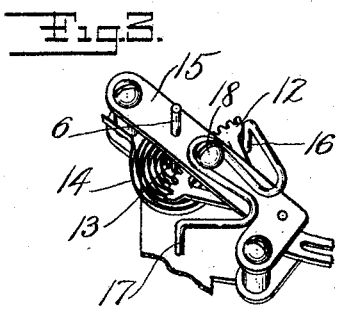
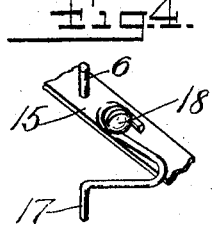
Inventor
E. L. Aschenbach
By his Attorneys

UNITED STATES PATENT OFFICE.

EMERSON L. ASCHENBACH, OF SELLERSVILLE, PENNSYLVANIA, ASSIGNOR TO UNITED STATES GAUGE COMPANY, OF NEW YORK, N. Y., A CORPORATION OF PENNSYLVANIA.

GAUGE.

1,414,165. Specification of Letters Patent. Patented Apr. 25, 1922.

Application filed March 5, 1920. Serial No. 363,387.

*To all whom it may concern:*

Be it known that I, EMERSON L. ASCHENBACH, a citizen of the United States of America, residing at Sellersville, Bucks County, Pennsylvania, have invented a new and useful Gauge, of which the following is a specification.

My invention relates particularly to a gauge of the Bourdon type.

The main object is to provide a simple and inexpensive but reliable construction for accurately indicating the normal or usual pressures and for more approximately indicating pressures above or below the normal range.

The invention is applicable to the ordinary type of Bourdon gauge construction, requiring simply, the addition of a simple spring device attached to the frame of the mechanism and the provision of a suitable scale.

Figure 1 is a front view of a gauge embodying the improvements of my invention, the pointer being shown at the zero pressure position; obviously the scale may be graduated in any desired unit of measurement;

Fig. 2 is a front view with most of the casing removed;

Fig. 3 is a perspective view of the transmitting mechanism and the modifying spring device;

Fig. 4 is a perspective view showing a spring device intended to operate only above the normal range pressures.

The pointer 5 is mounted on a shaft or spindle 6 and adapted to travel in front of the dial 7 inside the casing 8.

The tube 9 is supported at one end by the usual base or body member 10 and has its movable end connected by a link 11 with a slotted sector 12. The latter meshes with a pinion 13 on the shaft 6, which is under tension of a spring 14, tending to return the pointer to the lowest scale reading. All the mechanism is supported by a frame 15 independently of the casing.

The spring arm 16 serves as a limit or abutment to the sector 12, so that the pointer will indicate zero pressure under normal non-pressure conditions.

Another spring arm 17 is interposed in the path of movement of the sector 12 and brought into play when the pointer reaches what may be termed the "upper limit" of the normal range of the gauge and dial; for instance, at the right hand No. 10 on the dial. When the pressure rises above 10, the movement of the tube and sector is resisted by the spring arm 17, so that, for a given increase in pressure, the angular movement of the pointer will be substantially less. It is thus possible for the gauge to be used to indicate with accuracy the normal pressures of the device, and also to indicate more approximately a very much greater range of pressures.

In case the pressure in the system falls below atmospheric, so that the gauge is subjected to a vacuum, the spring 16 will yield and allow the sector and pointer to move so as to indicate the minus pressure, although with a more approximate degree of accuracy than that of the normal range of the scale.

The two springs 16 and 17 may be integral and formed like the letter W and held to the frame 15 by means of a screw 18. It will be seen that this spring attachment is light and inexpensive, and can be readily adjusted by loosening the screw 18 and moving the spring to the desired position. It will be obvious that the idea of my invention may be embodied in a device having vacuum and high pressure ratings, or that either arm of the spring may be omitted so that the device will be available for normal pressures, and either the vacuum or high range without the other range. For instance, in Fig. 4 I have omitted the arm 16, so that such a device would be useful for indicating pressures in excess of the normal range, but would not be suitable for vacuum indications, except upon a scale similar to the normal scale.

The spring arms are preferably so arranged that the bent ends which are engaged by the sector swing substantially about the axis of the sector, so as to produce as little sliding and friction between the sector and the spring as possible.

I claim:

1. In a gauge construction, a Bourdon tube, a sector, an indicating means moved thereby, a frame supporting said parts, and a spring secured to said frame and having an arm bent into the path of movement of said sector for modifying the action thereof.

2. In a gauge construction, a Bourdon tube, a sector connected to the movable end thereof, an indicating means operated by said sector, a frame supporting said parts, and an adjustable spring secured to said frame and having a bent arm projecting into the path of movement of said sector.

3. In a gauge construction, a Bourdon tube, a sector connected with the movable end thereof, an indicating means operated by said sector, supporting means for said parts, and a W-shaped spring member mounted intermediate its length on said supporting means, the free ends of said spring being extended into the path of movement of the sector for modifying the action thereof in both directions.

4. In a gauge construction, a Bourdon tube, a sector connected to the movable end thereof, an indicating means operated by said sector, a frame supporting said parts, and a spring also mounted on said supporting means and having two free ends co-acting with said sector for modifying the movement thereof in both directions beyond certain limits, said sector moving free of said spring within certain limits.

EMERSON L. ASCHENBACH.